US007913486B2

(12) United States Patent
Shimoda et al.

(10) Patent No.: US 7,913,486 B2
(45) Date of Patent: Mar. 29, 2011

(54) EXHAUST EMISSION CONTROL DEVICE

(75) Inventors: Masatoshi Shimoda, Hino (JP);
Yoshihide Takenaka, Hino (JP)

(73) Assignee: Hino Motors, Ltd., Hino-shi (JP)

(*) Notice: Subject to any disclaimer, the term of this patent is extended or adjusted under 35 U.S.C. 154(b) by 279 days.

(21) Appl. No.: 11/721,057

(22) PCT Filed: Dec. 7, 2005

(86) PCT No.: PCT/JP2005/022448
§ 371 (c)(1),
(2), (4) Date: Jun. 15, 2009

(87) PCT Pub. No.: WO2006/062124
PCT Pub. Date: Jun. 15, 2006

(65) Prior Publication Data
US 2009/0293454 A1 Dec. 3, 2009

(30) Foreign Application Priority Data

Dec. 8, 2004 (JP) ................................ 2004-355041
Dec. 10, 2004 (JP) ................................ 2004-357732

(51) Int. Cl.
*F01N 3/00* (2006.01)
*F01N 3/10* (2006.01)
(52) U.S. Cl. ................ 60/275; 60/286; 60/295; 60/301; 60/303
(58) Field of Classification Search ............... 60/275, 60/285, 286, 295, 297, 301, 303, 311
See application file for complete search history.

(56) References Cited

U.S. PATENT DOCUMENTS

| 6,260,353 B1* | 7/2001 | Takahashi ................... 60/286 |
| 6,374,595 B1 | 4/2002 | Penetrante et al. |
| 6,758,035 B2* | 7/2004 | Smaling ..................... 60/285 |
| 2003/0101713 A1* | 6/2003 | Dalla Betta et al. ........... 60/284 |
| 2004/0050035 A1 | 3/2004 | Smaling |
| 2004/0107695 A1* | 6/2004 | Cho et al. ................... 60/275 |
| 2004/0173450 A1* | 9/2004 | Fisher et al. ................. 204/164 |
| 2004/0175305 A1* | 9/2004 | Nakanishi et al. ........ 422/186.04 |
| 2005/0178107 A1* | 8/2005 | Mital et al. .................. 60/275 |

(Continued)

FOREIGN PATENT DOCUMENTS

DE 195 10 804 A1 9/1996

(Continued)

OTHER PUBLICATIONS

U.S. Appl. No. 11/569,688, filed Nov. 28, 2006, Hosoya, et al.

(Continued)

*Primary Examiner* — Thomas E Denion
*Assistant Examiner* — Audrey Klasterka
(74) *Attorney, Agent, or Firm* — Oblon, Spivak, McClelland, Maier & Neustadt, L.L.P.

(57) ABSTRACT

An exhaust emission control device is disclosed. The device includes an $NO_x$-occlusion reduction catalyst incorporated in an exhaust passage for reduction and purification of $NO_x$, a fuel reforming catalyst structure and plasma fuel reforming unit for decomposition of the fuel into $H_2$ and CO is arranged in the exhaust passage upstream of the reduction catalyst, so that the fuel is decomposed into $H_2$ and CO such that $NO_x$ on the surface of the $NO_x$-occlusion reduction catalyst can be efficiently reduced into $N_2$. Thus, high $NO_x$ reduction ratio can be always obtained irrespective of variety of operational conditions.

4 Claims, 6 Drawing Sheets

U.S. PATENT DOCUMENTS

2005/0274104 A1* 12/2005 Bromberg et al. ............... 60/275
2006/0288689 A1* 12/2006 Shimoda ......................... 60/275

FOREIGN PATENT DOCUMENTS

| | | |
|---|---|---|
| EP | 1 188 908 A2 | 3/2002 |
| JP | 2000 356127 | 12/2000 |
| JP | 2004 84638 | 3/2004 |
| JP | 2004 046514 | 6/2004 |
| JP | 2004 211565 | 7/2004 |
| JP | 2004 290965 | 10/2004 |
| WO | WO 03/048536 A1 | 6/2003 |
| WO | WO 2004/101965 A1 | 11/2004 |
| WO | WO 2004104385 A1 * | 12/2004 |

OTHER PUBLICATIONS

U.S. Appl. No. 12/158,705, filed Jun. 23, 2008, Takenaka.

* cited by examiner

US 7,913,486 B2

EXHAUST EMISSION CONTROL DEVICE

TECHNICAL FIELD

The present invention relates to an exhaust emission control device.

BACKGROUND ART

Conventionally, exhaust purification has been tried by an exhaust purifying catalyst incorporated in an exhaust pipe. Known as such exhaust purifying catalyst is a $NO_x$-occlusion reduction catalyst having a feature of oxidizing $NO_x$ in exhaust gas for temporary occlusion in the form of nitrate salt when exhaust/fuel ratio is lean, and decomposing and discharging $NO_x$ through intervention of unburned HC, CO and the like for reduction and purification when $O_2$ concentration in the exhaust gas is lowered.

Known as such $NO_x$-occlusion reduction catalyst having the above-mentioned feature is, for example, an alumina catalyst carrying platinum and barium or platinum and potassium.

Since no further $NO_x$ can be occluded once an occluded $NO_x$ amount increases into saturation in the $NO_x$-occlusion reduction catalyst, it is periodically required to lower the $O_2$ concentration in the exhaust gas flowing into the reduction catalyst to decompose and discharge $NO_x$.

In application to, for example, a gasoline engine, lowering the operational air/fuel ratio in the engine (operating the engine with rich air/fuel ratio) can lower the $O_2$ concentration and increase the reduction components such as unburned HC and CO in the exhaust gas for facilitation of decomposition and discharge of $NO_x$. However, in use of a $NO_x$-occlusion reduction catalyst in an exhaust emission control device for a diesel engine, it is difficult to operate the engine with rich air/fuel ratio.

This results in necessity of newly arranging means for adding fuel (HC) into the exhaust gas upstream of the $NO_x$-occlusion reduction catalyst so as to react the added fuel as reducing agent with $O_2$ on the reduction catalyst to thereby actively lower the $O_2$ concentration in the exhaust gas to regenerate the reduction catalyst.
[Reference 1] JP 2000-356127A

SUMMARY OF THE INVENTION

Problems to be Solved by the Invention

However, in such fuel addition upstream of the $NO_x$-occlusion reduction catalyst part of HC generated due to evaporation of the added fuel reacts (burns) with $O_2$ in the exhaust gas on the $NO_x$-occlusion reduction catalyst, and decomposition and discharge of $NO_x$ is started after the $O_2$ concentration substantially becomes zero in an atmosphere surrounding the reduction catalyst. Thus, in an operational condition where a combustion temperature (about 220-250° C.) required for reaction (combustion) of HC with $O_2$ on a $NO_x$-occlusion reduction catalyst cannot be obtained (for example, operation at reduced speeds on city roads often congested with traffic), $NO_x$ cannot be efficiently decomposed and discharged from the $NO_x$-occlusion reduction catalyst and regeneration of the reduction catalyst does not efficiently progress, disadvantageously resulting in lowering of recovery ratio of $NO_x$-occlusion sites occupied in volume of the catalyst to deteriorate occlusion capacity.

The invention was made in view of the above and has its object to provide an exhaust emission control device which can always obtain high $NO_x$ reduction ratio irrespective of operational condition or to provide an exhaust emission control device which can obtain high $NO_x$ reduction ratio even in a relatively low temperature area.

Means or Measures for Solving the Problems

According to a first aspect of the invention, the invention is directed to an exhaust emission control device with a $NO_x$-occlusion reduction catalyst incorporated in an exhaust passage so as to reduce and purify $NO_x$, comprising fuel reforming means (fuel reforming catalyst structure or plasma fuel reforming means) arranged in the exhaust passage upstream of the $NO_x$-occlusion reduction catalyst for decomposing fuel into $H_2$ and CO.

According to a second aspect of the invention, in the first aspect, plasma generating means is arranged in the exhaust passage upstream of the fuel reforming means so as to oxidize NO into $NO_2$.

According to a third aspect of the invention, in the second aspect, the plasma generating means is controlled to oxidize NO into $NO_2$ for acceleration of $NO_x$-occlusion by the $NO_x$-occlusion reduction catalyst when exhaust/fuel ratio is lean.

According to a fourth aspect of the invention, in the first aspect, the fuel reforming means is controlled to decompose the fuel into $H_2$ and CO for reduction of $NO_x$ in the $NO_x$-occlusion reduction catalyst when air/fuel ratio is fuel-rich.

According to a fifth aspect of the invention, in the first aspect, the fuel reforming means is controlled to feed the fuel without decomposition to instantly make the fuel denser when exhaust temperature is sufficiently high.

According to a sixth aspect of the invention, the invention comprises a $NO_x$-occlusion reduction catalyst incorporated in an exhaust pipe for exhaust gas from an engine, a fuel injection controller for controlling fuel injection in said engine so as to leave unburned fuel as reducing agent in the exhaust gas in large quantity upon regeneration of said $NO_x$-occlusion reduction catalyst, and a plasma generator for discharging electricity in the exhaust gas upstream of said $NO_x$-occlusion reduction catalyst to generate plasma and decompose through said plasma the unburned fuel into $H_2$ and CO.

According to a seventh aspect of the invention, in the sixth aspect, a fuel addition unit is additionally arranged in the exhaust pipe upstream of the plasma generator for direct addition of the fuel.

According to the first aspect of the invention, the decomposition into $H_2$ and CO can be made by the fuel reforming means, so that $NO_x$ on the $NO_x$-occlusion reduction catalyst can be efficiently reduced by such $H_2$ and CO into $N_2$; as a result, high $NO_x$ reduction ratio can be always obtained irrespective of variety of operational conditions. Since the fuel is decomposed by the fuel reforming means into $H_2$ and CO and high $NO_x$ reduction ratio can be obtained by such highly reactive $H_2$ and CO even at a relatively low temperature area, $NO_x$ contained in the exhaust gas discharged outside of a vehicle can be reduced more effectively than in the conventional art even in an operational condition where a low-load operational status with low exhaust temperature such as operation at reduced speeds on city roads often congested with traffic tends to continue.

According to the second aspect of the invention, the plasma generating means, which is arranged in the exhaust passage upstream of the fuel reforming means so as to oxidize NO into $NO_2$, can oxidize NO into $NO_2$ irrespective of temperature, which can facilitate $NO_x$-occlusion by the $NO_x$-occlusion reduction catalyst.

According to the third aspect of the invention, the plasma generating means is controlled to oxidize NO into $NO_2$ for facilitation of $NO_x$-occlusion by the $NO_x$-occlusion reduction catalyst when the exhaust/fuel ratio is lean, which can further facilitate the $NO_x$-occlusion by the $NO_x$-occlusion reduction catalyst.

According to the fourth aspect of the invention, the fuel reforming means is controlled to decompose the fuel into $H_2$ and CO for reduction of $NO_x$ in the $NO_x$-occlusion reduction catalyst when the air/fuel ratio is fuel-rich, so that $NO_x$ on the surface of the $NO_x$-occlusion reduction catalyst can be further effectively reduced by $H_2$ and CO into $N_2$.

According to the fifth aspect of the invention, the fuel reforming means is controlled to feed the fuel without decomposition to instantly make the fuel denser when the exhaust temperature is sufficiently high, so that $NO_x$ on the surface of the $NO_x$-occlusion reduction catalyst can be suitably reduced into $N_2$.

In the sixth aspect of the invention, the fuel injection to the respective cylinders of the engine is controlled by the fuel injection controller to leave the unburned fuel in large quantity in the exhaust gas, so that the unburned fuel is guided as reducing agent together with the exhaust gas to the $NO_x$-occlusion reduction catalyst.

When electricity is discharged by the upstream plasma generator to the exhaust gas containing such unburned fuel in large quantity, the unburned fuel (HC) in the exhaust gas is decomposed by partial oxidization through the plasma into $H_2$ and CO, so that the highly reactive $H_2$ and CO are reacted (burned) with $O_2$ in the exhaust gas on the surface of the downstream $NO_x$-occlusion reduction catalyst even at a lower combustion temperature than conventional HC combustion temperature.

Thus, in the sixth aspect of the invention, $O_2$ concentration in the atmosphere surrounding the $NO_x$-occlusion reduction catalyst becomes substantially zero and the decomposition and discharge of $NO_x$ starts, so that $NO_x$ is efficiently reduced by highly reactive $H_2$ and CO into $N_2$ on the surface of the $NO_x$-occlusion reduction catalyst. As a result, high $NO_x$ reduction ratio can be obtained even at a relatively low temperature area in comparison with the conventional reaction of HC itself generated from the unburned fuel on the $NO_x$-occlusion reduction catalyst.

In the seventh aspect of the invention, the fuel addition unit may be additionally arranged in the exhaust pipe upstream of the plasma generator so as to directly add the fuel to the exhaust pipe. Thus, the fuel is directly added to the exhaust pipe by the fuel addition unit as needs demand, so that the reducing atmosphere required for regeneration of the $NO_x$-occlusion reduction catalyst can be realized further reliably.

EFFECTS OF THE INVENTION

According to the first to fifth aspects of the invention, obtainable is an excellent effect that high $NO_x$ reduction ratio can be always obtained since, irrespective of temperature, NO can be oxidized into $NO_2$ or the fuel can be decomposed into $H_2$ and CO.

According to the sixth and seventh aspects of the invention, fuel addition is conducted in such a manner that the fuel injection to the respective cylinders is controlled at engine side to leave unburned fuel in large quantity in the exhaust gas, said unburned fuel (HC) in the exhaust gas being decomposed by the plasma generated through electric discharge by the upstream plasma generator into $H_2$ and CO, so that, by such highly reactive $H_2$ and CO, high $NO_x$ reduction ratio can be obtained even at a relatively low temperature area. Thus, even in an operational condition where a low-load operational status with lower exhaust temperature such as operation at reduced speeds on city roads often congested with traffic tends to continue, obtainable are the effects that $NO_x$ contained in exhaust gas discharged outside of a vehicle can be reduced more efficiently than the conventional art and that the exhaust emission control device with the $NO_x$-occlusion reduction catalyst can be substantially enhanced in its utility.

Figure 1:
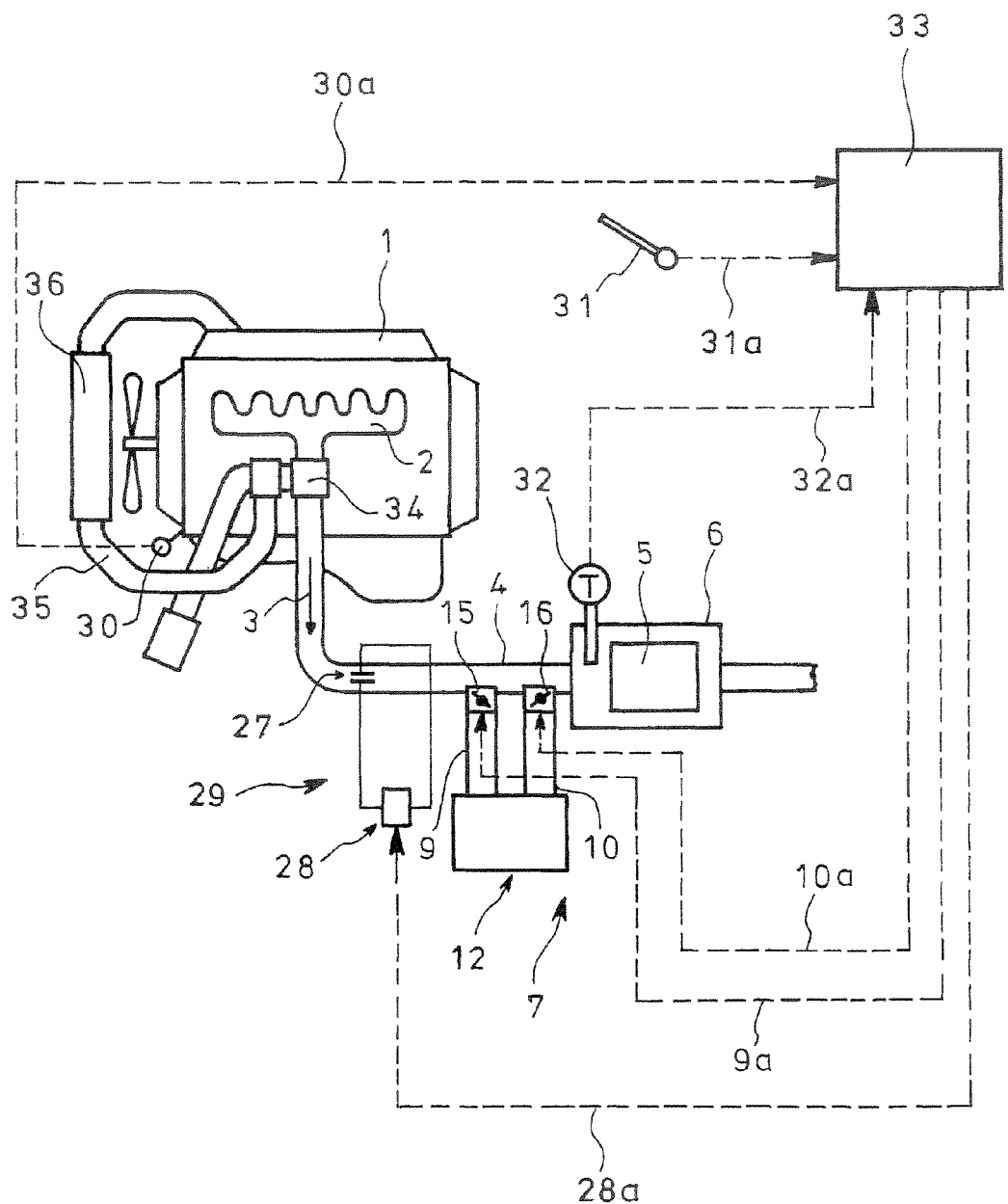
FIG. 1 A schematic view showing an embodiment of the invention using a fuel reforming catalyst structure.

EXPLANATION OF THE REFERENCE NUMERALS 2 exhaust manifold (exhaust passage)
4 exhaust pipe (exhaust passage)
5 $NO_x$-occlusion reduction catalyst
7 fuel reforming catalyst structure (fuel reforming means)
8 plasma fuel reforming means (fuel reforming means)
29 plasma generating means
41 diesel engine (engine)
43 exhaust gas
44 exhaust pipe
45 $NO_x$-occlusion reduction catalyst
47 plasma generator
54 controller (fuel injection controller)
55 fuel injection unit
55a fuel injection signal
61 fuel addition unit

BEST MODE FOR CARRYING OUT THE INVENTION

Embodiments of the invention will be described in conjunction with the drawings.

FIGS. 1-4 show an embodiment of the invention using $NO_x$-occlusion reduction catalyst 5 with a flow-through type honeycomb structure which is carried by a casing 6 and incorporated in an exhaust pipe 4 through which in turns flows exhaust gas 3 discharged from a diesel engine 1 via an exhaust manifold 2.

Arranged in the exhaust pipe 4 upstream of the casing 6 is fuel reforming means, i.e., a fuel reforming catalyst structure 7 or plasma fuel reforming means 8.

Figure 3:
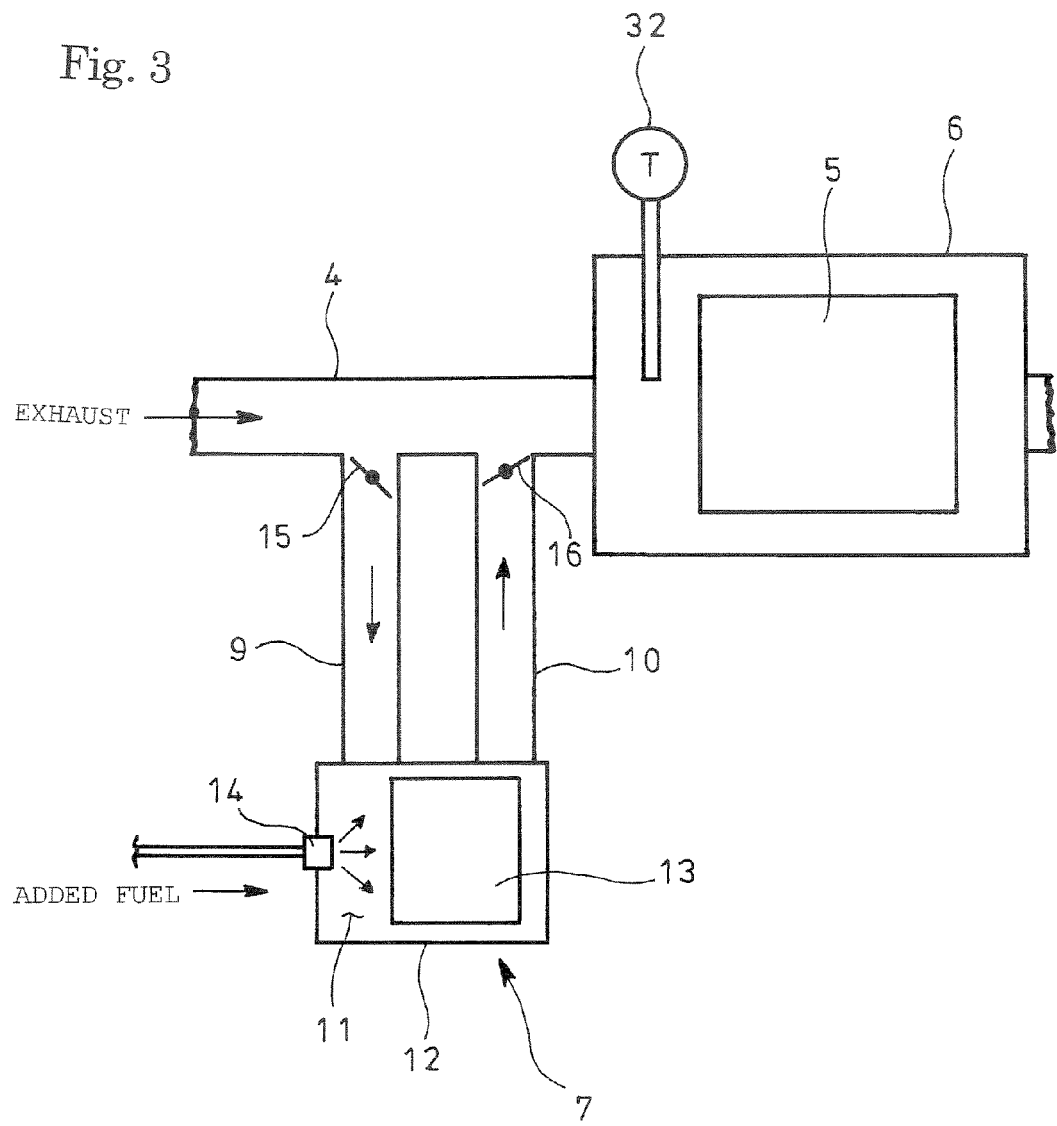
FIG. 3 A schematic view showing the fuel reforming catalyst structure of the invention.

In a preferred embodiment of the fuel reforming catalyst structure 7, the structure 7 comprises, as shown in FIGS. 1 and 3, a fuel reformer 12 with feed and discharge pipes 9 and 10 from and to the exhaust pipe 4 and providing an inner space 11, a fuel reforming catalyst 13 in the reformer 12, a fuel addition nozzle 14 for addition of the fuel to the inner space 11 of the reformer 12 from upstream, a feed valve 15 for selectively opening and closing the feed pipe 9 and a discharge valve 16 for selectively opening and closing the discharge pipe 10.

Figure 2:
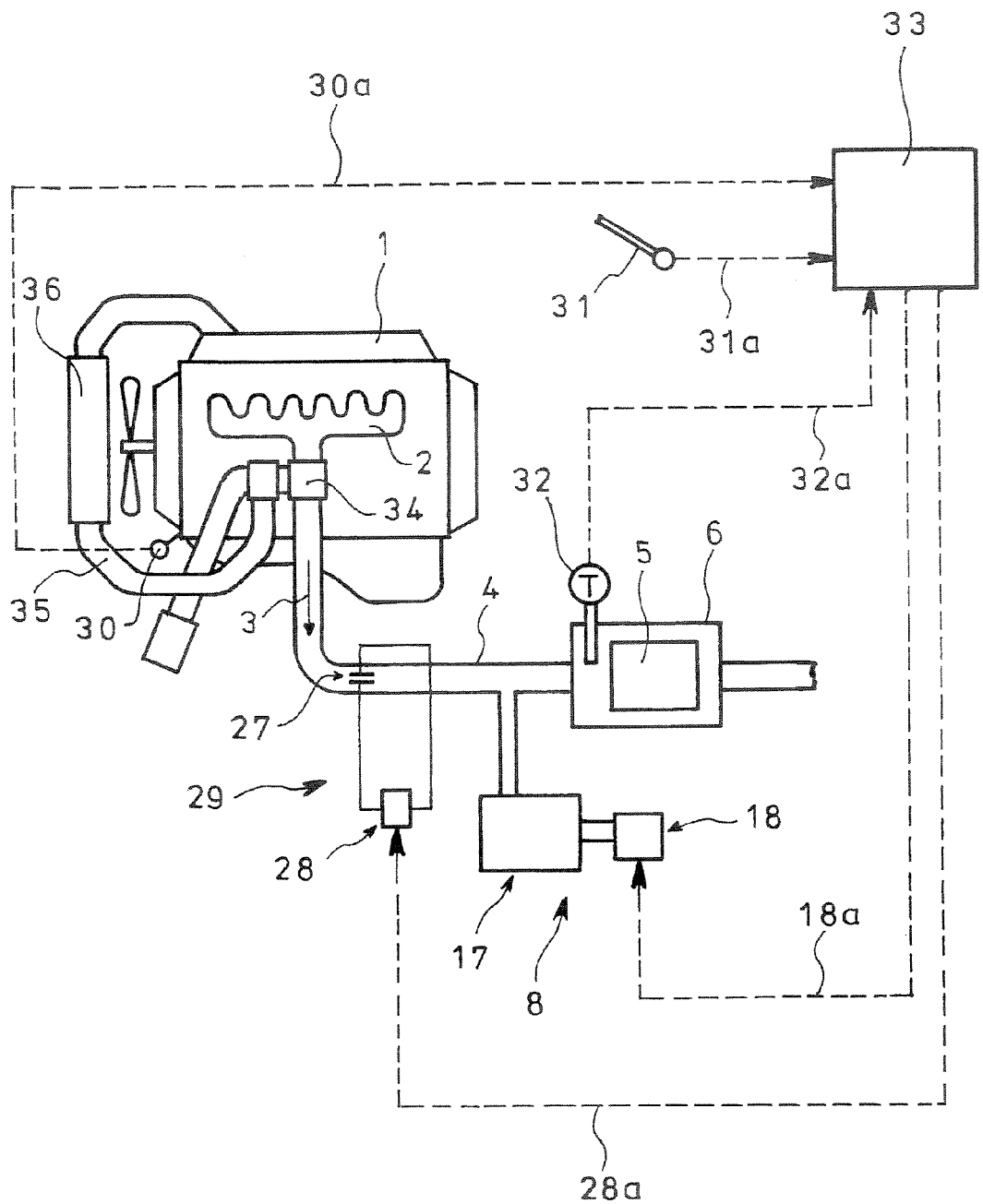
FIG. 2 A schematic view showing the embodiment of the invention using plasma fuel reforming means.
Figure 4:
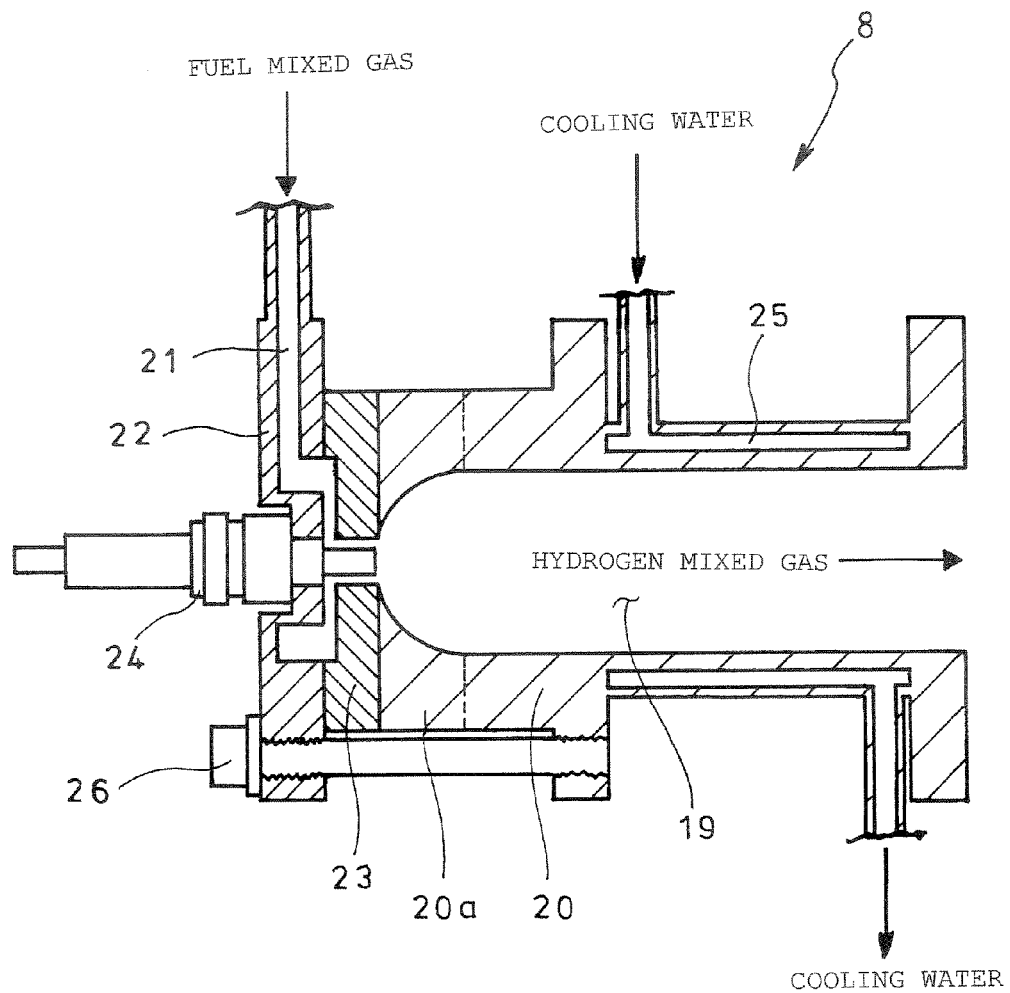
FIG. 4 A schematic view showing the plasma fuel reforming means of the invention.

In a preferred embodiment of the plasma fuel reforming means 8, the means 8 comprises, as shown in FIGS. 2 and 4, a plasma fuel reformer 17 communicated with the exhaust pipe 4 and a high-voltage power supply 18 for applying voltage to the reformer 17. The plasma fuel reformer 17 comprises a discharge portion 20 which is an earth electrode and provides an inner space 19 communicated with the exhaust pipe 4, an introduction portion 22 which provides a mixed gas passage 21 to guide a fuel mixed gas of air with fuel such as light oil to the inner space 19 in the discharge portion 20, an insulator portion 23 between the portions 20 and 22, and a high-voltage electrode 24 supported by the introduction portion 22. In the figures, reference numeral 25 denotes a cooling water passage for cooling of the discharge portion 20; and 26, a locking bolt for locking of the portions 20 and 22. An end 20a of the discharge portion 20 adjacent to the electrode 24 may be an insulator in lieu of the earth electrode.

As shown in FIGS. 1 and 2, plasma generating means 29 is arranged in the exhaust pipe 4 upstream of the fuel reforming means (fuel reforming catalyst structure 7 or plasma fuel reforming means 8) and comprises a plasma generator 27 in the form of a pair of oppositely arranged flat electrodes in the exhaust pipe 4 and a high-voltage power supply 28 for application of voltage to the plasma generator 27.

The diesel engine 1 is provided with a revolution sensor 30 for detection of revolution speed of the engine. Inputted to a controller 33 are a revolution speed signal 30a from the revolution sensor 30, a load signal 31a from an accelerator sensor 31 (sensor for sensing stepped-in angle of an accelerator pedal) and a temperature signal 32a from a temperature sensor 32 arranged in the exhaust pipe 4.

In the controller 33, $NO_x$ generation amount and the like are estimated on the basis of a current operational status judged from the above-mentioned revolution speed and load signals 30a and 31a from the sensors 30 and 31. On the basis of the estimated $NO_x$ generation amount, the temperature signal 32a from the sensor 32 and the like, controlled are the fuel reforming means (fuel reforming catalyst structure 7 or plasma fuel reforming means 8) and the plasma generating means 29. Alternatively, the controller 33 may receive signals from other sensors to control the fuel reforming means and the plasma generating means 29.

In FIGS. 1 and 2, reference numeral 34 denotes a turbocharger; 35, an intake pipe; and 36, an intercooler.

Next, mode of operation of the embodiment according to the invention will be described.

In various operational status, when the $NO_x$ generation amount and the like are estimated from the revolution and accelerator sensors 30 and 31 and the temperature is sensed by the temperature sensor 32, a control signal 28a is properly transmitted by the controller 33 to the plasma generating means 29 to control the plasma generating means 29. In the case of the fuel reforming catalyst structure 7, control signals 9a and 10a are transmitted by the controller 33 to the fuel reforming catalyst structure 7 for control of added fuel amount through the nozzle 14 and for control of opening and closing of the feed and discharge valves 15 and 16; in the case of the plasma fuel reforming means 8, a control signal 18a is transmitted by the controller 33 to the plasma fuel reforming means 8 for control of the added fuel amount and supply of the high-voltage power supply 18.

Then, in the plasma generating means 29, high voltage is applied by the power supply 28 to the plasma generator 27 in the form of the flat electrodes to generate plasma in the exhaust pipe 4, thereby oxidizing NO in the exhaust gas 3 into $NO_2$ with no affection by temperature.

In the fuel reforming catalyst structure 7, the addition amount of fuel to be fed to the fuel reformer 12 is controlled and the temperature is controlled, whereby generation of $H_2$ and CO by the fuel reforming catalyst 13 is controlled to feed the same into the exhaust gas 3. In the plasma fuel reforming means 8, high voltage is applied to the electrode 24 by the power supply 18 to generate plasma in the inner space 19 through barrier discharge, so that with no affection by temperature, the fuel is reformed into $H_2$ and CO in the inner space 19, reformed gas (hydrogen mixed gas) being fed into the exhaust gas 3.

When the exhaust/fuel ratio is lean, the plasma generating means 29 is activated by the control signal 28a from the controller 33 to oxidize NO into $NO_2$ for facilitation of $NO_x$-occlusion by the $NO_x$-occlusion reduction catalyst 5. When $NO_x$ is to be reduced with the air/fuel ratio being fuel-rich, the fuel reforming means (fuel reforming catalyst structure 7 or plasma fuel reforming means 8) is activated by the control signals 9a and 10a or 18a from the controller 33 to decompose the fuel into $H_2$ and CO and feed the same into the exhaust gas 3, whereby $NO_x$ occluded in the $NO_x$-occlusion reduction catalyst 5 is effectively reduced.

When the exhaust temperature is sufficiently high (as high as 350° C. or more), with no treatment by the fuel reforming catalyst 13 of the structure 7 or with no application of high voltage to the electrode 24 of the means 8, through control by the controller 33, the fuel may flow down and be fed without decomposition and instantly made denser as rich spike to reduce $NO_x$ occluded in the $NO_x$-occlusion reduction catalyst 5.

Thus, according to the embodiment of the invention, decomposition into $H_2$ and CO can be made by the fuel reforming means (fuel reforming catalyst structure 7 or plasma fuel reforming means 8), so that $NO_x$ on the surface of the $NO_x$-occlusion reduction catalyst 5 can be efficiently reduced into $N_2$ by $H_2$ and Co; as a result, high $NO_x$ reduction ratio can be always obtained irrespective of variety of operational conditions.

Since the fuel can be decomposed by the fuel reforming means into $H_2$ and CO to obtain high $NO_x$ reduction ratio even at a relatively low temperature by the highly reactive $H_2$ and CO, $NO_x$ contained in the exhaust gas discharged outside of a vehicle can be reduced more effectively than the conventional art even in the operational condition such as operation with reduced speeds on city roads often congested with traffic where low-load operation with low exhaust temperature tends to continue.

In the embodiment of the invention, the plasma generating means 29 for oxidization of NO into $NO_2$ is arranged in the exhaust passage upstream of the fuel reforming means, which makes it possible to oxide NO into $NO_2$ by the plasma generating means 29 irrespective of temperature and to facilitate $NO_x$-occlusion by the $NO_x$-occlusion reduction catalyst 5.

In the embodiment of the invention, the plasma generating means 29 is controlled by the controller 33 to oxidize NO into $NO_2$ for facilitation of $NO_x$-occlusion by the $NO_x$-occlusion reduction catalyst 5 when the exhaust/fuel ratio is lean, which can further facilitate $NO_x$-occlusion by the $NO_x$-occlusion reduction catalyst 5.

In the embodiment of the invention, the fuel reforming means is controlled by the controller 33 to decompose the fuel into $H_2$ and CO to reduce $NO_x$ in the $NO_x$-occlusion reduction catalyst 5 when the air/fuel ratio is fuel-rich, so that $NO_x$ on the surface of the $NO_x$-occlusion reduction catalyst 5 can be still further efficiently reduced into $N_2$ by $H_2$ and CO.

In the embodiment of the invention, the fuel reforming means is controlled by the controller 33 to feed the fuel without decomposition and instantly make the fuel denser when the exhaust temperature is sufficiently high (as high as 350° C. or more), so that $NO_x$ on the surface of the $NO_x$-occlusion reduction catalyst 5 can be properly reduced into $N_2$.

Next, a further embodiment of the invention will be described in conjunction with the drawings.

Figure 5:
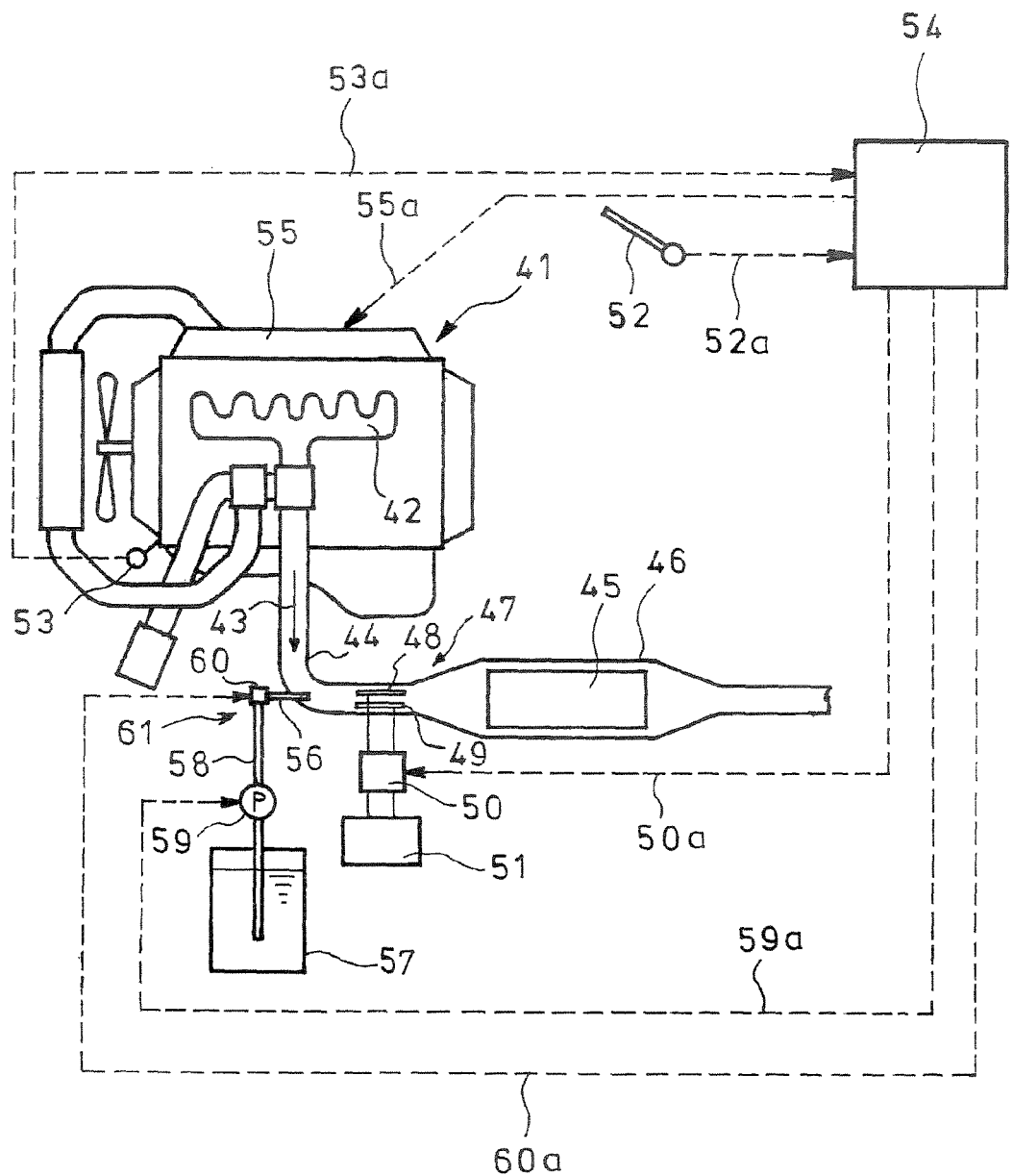
FIG. 5 A schematic view showing a further embodiment of the invention.
Figure 6:
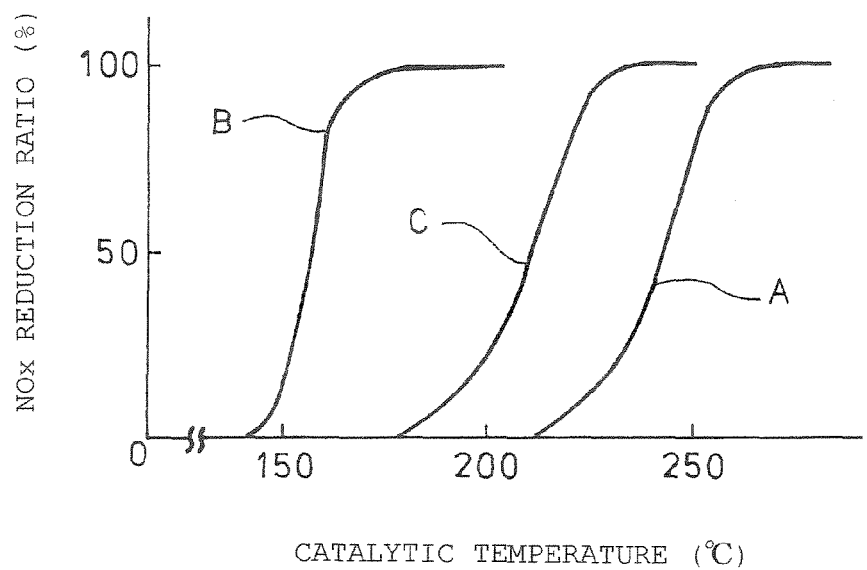
FIG. 6 A graph showing relationship between $NO_x$ reduction ratio and catalytic temperature in comparison with a comparative example.
Figure 7:
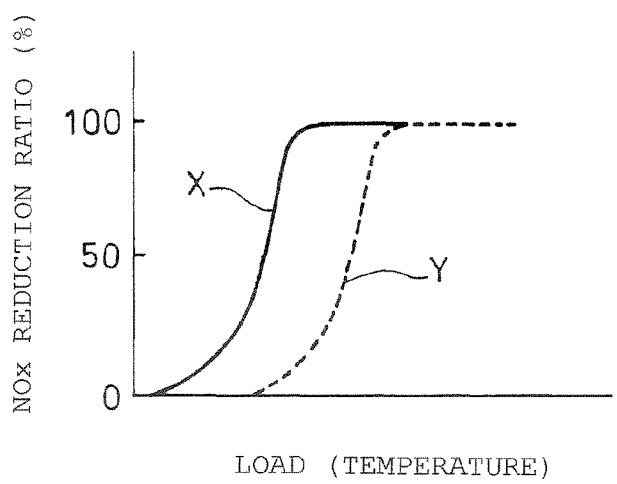
FIG. 7 A graph showing relationship between $NO_x$ reduction ratio and load in comparison with a comparative example.

FIGS. 5-7 show the further embodiment of the invention. As shown in FIG. 5, in the exhaust emission control device of the embodiment, incorporated in an exhaust pipe 44 through which exhaust gas 43 discharged via an exhaust manifold 42 from a diesel engine 41 flows is a $NO_x$-occlusion reduction catalyst 45 with a flow-through type honeycomb structure carried by a casing 46. Arranged upstream of the casing 46 is a plasma generator 47 which discharges electricity into the exhaust gas 43 to generate plasma.

In the plasma generator 47, electrodes 48 and 49 are oppositely arranged to discharge electricity therebetween. The electrodes 48 and 49 may be of various shapes such as plate, rod or cylinder, provided that distance between the electrodes 48 and 49 can be set substantially uniformly.

The construction is such that the respective electrodes 48 and 49 are connected through an inverter 50 to a power supply 51. Especially in the embodiment, since a battery loaded in a vehicle is envisaged as the power supply 51, the inverter 51 is adapted for application of AC high voltage with proper voltage and frequency for electric discharge to the respective electrodes 48 and 49.

Arranged on an accelerator pedal (not shown) in a driver's cabin is an accelerator sensor 52 (load sensor) for detection of an accelerator stepped-in degree as load to the diesel engine 41. Arranged in position in the engine 41 is a revolution sensor 53 for detection of a revolution speed of the engine. Accelerator stepped-in degree and revolution speed signals 52a and 53a from the sensors 52 and 53 are inputted to a controller 54 (fuel injection controller) which constitutes an engine-controlling computer (ECU: electronic control unit).

In the controller 54, in accordance with current operational status judged from the accelerator stepped-in degree and revolution speed signals 52a and 53a, a fuel injection signal 55a for command on injection timing and amount of the fuel is outputted to a fuel injection unit 55 for injection of the fuel into the respective cylinders.

The fuel injection unit 55 is constituted by a plurality of injectors (not shown) each for each cylinder, an electromagnetic valve in each of the injectors being controlled in its selective opening and closing by the fuel injection signal 55a from the controller 54 to control the injection timing and amount (valve opening time period) of the fuel.

In the embodiment, while in the normal mode the fuel injection signal 55a is determined in the controller 54 on the basis of the accelerator stepped-in degree and revolution speed signals 52a and 53a, the normal mode is periodically changed into regeneration mode. After change into the regeneration mode, main injection of the fuel near the compression upper dead center (crank angle being 0°) is followed by one or more post injections at non-injection timing (starting with crank angle of 90-120°) past the compression upper dead center.

More specifically, the main injection is followed by such post injection or injections at non-ignition timing past the compression upper dead center. Such post injection or injections bring about addition of unburned fuel (mainly HC: hydrocarbon) in the exhaust gas 43. HC generated by the unburned fuel is guided as reducing agent to the $NO_x$-occlusion reduction catalyst 45.

Moreover, when it is judged, on the basis of the accelerator stepped-in degree and revolution speed signals 52a and 53a, that the operational status is that with low exhaust temperature, electric-discharge command signal 50a is outputted by the controller 54 to the inverter 50 of the plasma generator 47, so that the inverter 50 receives such electric-discharge signal 50a and activates the plasma generator 47 to discharge electricity in the exhaust gas 43.

Inserted into and arranged in the exhaust pipe 44 upstream of the plasma generator 47 is an injection nozzle 56 which is connected with a light-oil tank 57 through a light-oil feed pipe 58. By driving a supply pump 59 incorporated in the light-oil feed pipe 58 and opening a light-oil injection valve 60, light oil (fuel as reducing agent) in the tank 57 may be directly added into the exhaust pipe 44 through the injection nozzle 56. A fuel addition unit 61 is constituted by such injection nozzle 56, light-oil tank 57, light-oil feed pipe 58, supply pump 59 and light-oil injection valve 60.

Outputted from the controller 54 as needs demand are a drive command signal 59a to the supply pump 59 and a valve-opening command signal 60a to the light-oil injection valve 60; by these command signals 59a and 60a, fuel is auxiliarily added by the fuel addition unit 61.

Thus, the fuel injection control in the controller 54 is periodically changed from the normal mode to the regeneration mode, so that the main injection of the fuel near the compression upper dead center is followed by post injection or injections at non-ignition timing past the compression upper dead center. By such post injection or injections, unburned fuel (mainly HC: hydrocarbon) is left in large quantity in the exhaust gas 43, and such unburned fuel is guided as reducing agent and together with the exhaust gas 43 to the $NO_x$-occlusion reduction catalyst 45.

When electricity is discharged by the upstream plasma generator 47 to the exhaust gas 43 containing unburned fuel in large quantity, the unburned fuel (HC) in the exhaust gas 43 is partly oxidized by the plasma and decomposed into $H_2$ and CO, and such highly reactive $H_2$ and CO is reacted (burned) with $O_2$ in the exhaust gas 43 on the surface of the downstream $NO_x$-occlusion reduction catalyst 45 even at a combustion temperature lower than the conventional HC combustion temperature.

Thus, the $O_2$ concentration in the atmosphere surrounding the $NO_x$-occlusion reduction catalyst 45 becomes substantially zero so that decomposition and discharge of $NO_x$ is started; $NO_x$ is efficiently reduced on the surface of the $NO_x$-occlusion reduction catalyst 45 directly by highly reactive $H_2$ and CO. As a result, high $NO_x$ reduction ratio can be obtained even at a relatively low temperature area in comparison with a case where HC generated from the unburned fuel is directly reacted on the $NO_x$-occlusion reduction catalyst 45.

Especially in the embodiment, the fuel addition unit 61 is additionally arranged in the exhaust pipe 44 upstream of the plasma generator 47 for direct addition of the light oil. Fuel may be directly added into the exhaust pipe 44 by the fuel addition unit 61 as needs demand, which makes it possible to more reliably realize reductive atmosphere required for regeneration of the $NO_x$-occlusion reduction catalyst 45.

Thus, according to the above-mentioned embodiment, fuel injection into the respective cylinders is controlled at the diesel engine 41 side to carry out post injection or injections following the main injection, so that fuel addition is conducted in such a manner that unburned fuel is left in large quantity in the exhaust gas 43; the unburned fuel (HC) in the exhaust gas 43 is decomposed by the upstream plasma generator 47 into $H_2$ and CO and, by such highly reactive $H_2$ and CO, high $NO_x$ reduction ratio can be obtained at a relatively low temperature area. Thus, even at an operational condition such as operation at reduced speeds on city roads often congested with traffic where low load operation with lower exhaust temperature tends to continue, $NO_x$ in the exhaust gas 43 discharged outside of a vehicle can be reduced more effectively than the conventional art, thereby substantially enhancing the utility of the exhaust emission control device using the $NO_x$-occlusion reduction catalyst 45.

In fact, according to results of experiments conducted by the inventors, as shown in the graph of FIG. 6, comparison was made between Case A where HC generated by added fuel is directly reacted on the $NO_x$-occlusion reduction catalyst 45, Case B where $H_2$ is reacted on the catalyst 45 and Case C where CO is reacted on the catalyst 45; it was confirmed that high $NO_x$ reduction ratio is obtained even at lower temperature area in Case C than in Case A and that in Case B, high $NO_x$ reduction ratio is obtained even at lower temperature area than in Case C. In the graph of FIG. 6, ordinate and abscissa indicate $NO_x$ reduction ratio and catalyst temperature, respectively.

Moreover, as shown in FIG. 7, comparison was made between Case X where unburned fuel is added in the embodiment with the previously explained structural composition and Case Y where with no plasma generator 47 only the $NO_x$-occlusion reduction catalyst 45 is provided and unburned fuel is added; it was confirmed that in Case X, high $NO_x$ reduction ratio can be obtained even at a lower load area (operational area with lower exhaust temperature) than in Case Y. In the graph of FIG. 7, ordinate and abscissa indicate $NO_x$ reduction ratio and load of the diesel engine 41, respectively.

It is to be understood that an exhaust emission control device according to the invention is not limited to the above embodiments and that various changes and modifications may be made without departing from the scope of the invention. For example, in place of the post injections following the main injection and at non-ignition timing past the compression upper dead center for leaving the unburned fuel in large quantity, the main injection itself may be conducted at injection timing later or sooner than usual for leaving the unburned fuel (HC) in great quantity.

The invention claimed is:

1. An exhaust emission control device with a $NO_x$-occlusion reduction catalyst incorporated in an exhaust passage so as to reduce and purify $NO_x$, comprising:

fuel reforming means arranged in the exhaust passage upstream of the $NO_x$-occlusion reduction catalyst for decomposing fuel into $H_2$ and CO;

plasma generating means arranged in the exhaust passage upstream of the fuel reforming means for oxidizing NO into $NO_2$; and a controller for controlling said fuel reforming means and said plasma generating means, wherein said controller controls said plasma generating means to oxidize NO into $NO_2$ for acceleration of $NO_x$-occlusion by the $NO_x$-occlusion reduction catalyst when exhaust/fuel ratio is lean, controls said fuel reforming means to decompose the fuel into $H_2$ and CO for reduction of $NO_x$ in the $NO_x$-occlusion reduction catalyst when air/fuel ratio is fuel-rich and controls said fuel reforming means to feed the fuel without decomposition to instantly make the fuel denser when exhaust temperature is sufficiently high.

2. The exhaust emission control device as claimed in claim 1, wherein the fuel reforming means comprises a plasma fuel reformer communicated with the exhaust passage and a high-voltage power supply for applying voltage to the reformer, and said plasma fuel reformer comprises a discharge portion which provides an inner space communicated with the exhaust passage, an introduction portion which provides a mixed gas passage to guide a fuel mixed gas to the inner space in the discharge portion, and insulator portion between the discharge and introduction portions, and a high-voltage electrode supported by the introduction portion.

3. The exhaust emission control device as claimed in claim 1, wherein the fuel reforming means comprises a fuel reformer with feed and discharge pipes from and to the exhaust passage and providing an inner space, a fuel reforming catalyst in the reformer, a fuel addition nozzle for addition of the fuel to the inner space of the reformer from upstream, a feed valve for selectively opening and closing the feed pipe, and a discharge valve for selectively opening and closing the discharge pipe.

4. The exhaust emission control device as claimed in claim 3, wherein the controller controls said fuel reforming means by controlling the amount of fuel added through said fuel addition nozzle and the opening and closing of the feed valve and the discharge valve.

* * * * *